Figure 3:
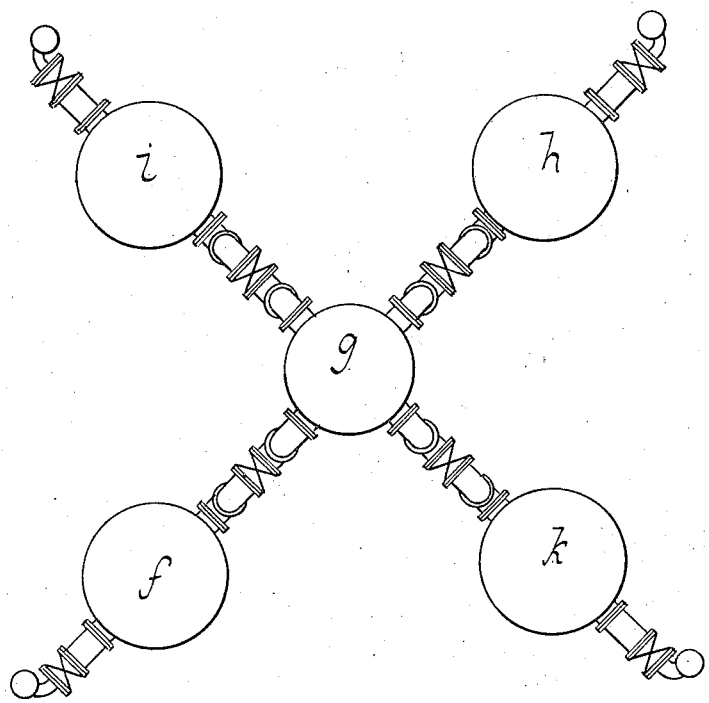

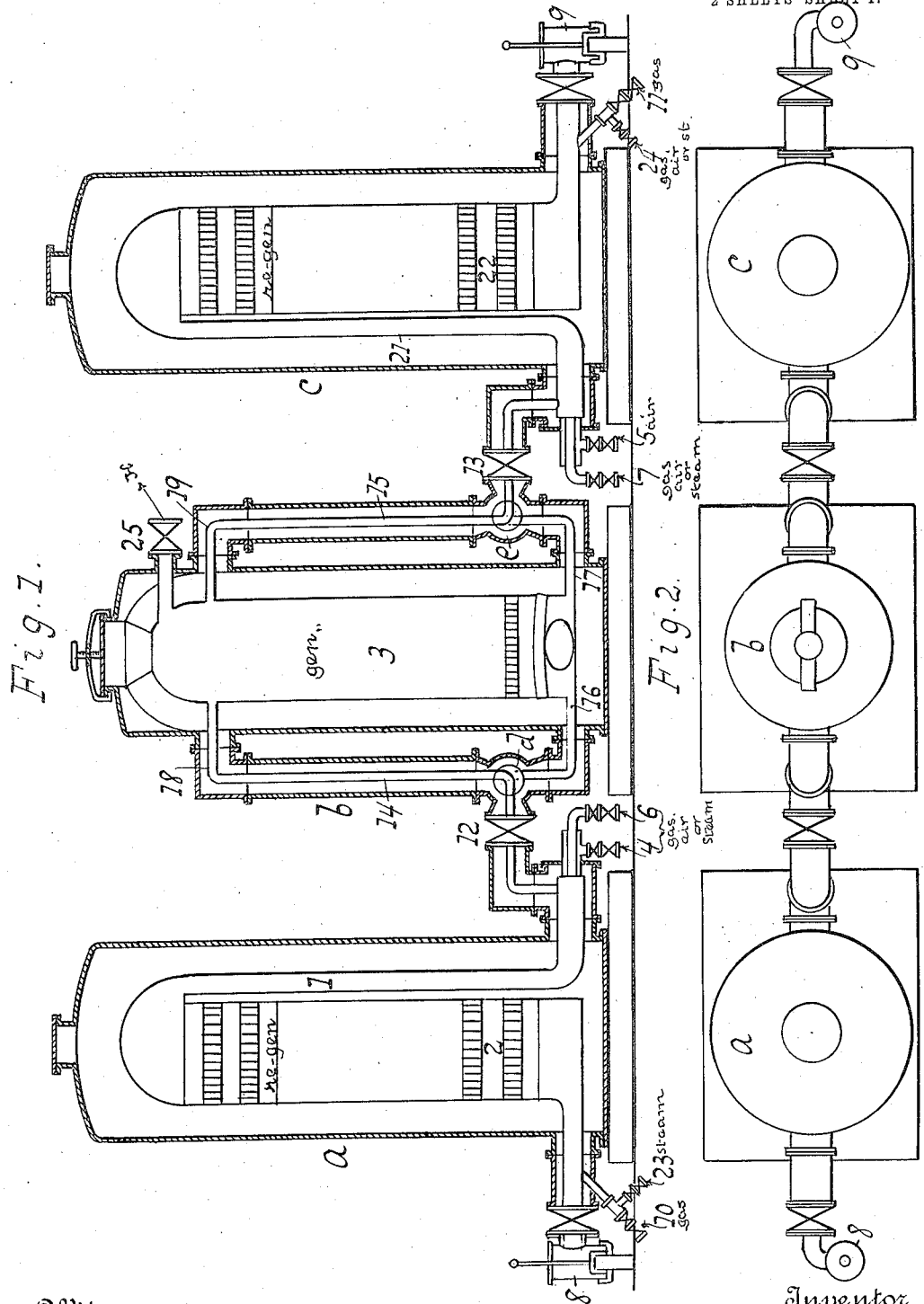

C. BOSCH.
PRODUCING HYDROGEN AND APPARATUS THEREFOR.
APPLICATION FILED JULY 7, 1913.

1,102,716.

Patented July 7, 1914.
2 SHEETS—SHEET 2.

Witnesses:

Inventor
Carl Bosch

UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

PRODUCING HYDROGEN AND APPARATUS THEREFOR.

1,102,716.     Specification of Letters Patent.     Patented July 7, 1914.

Application filed July 7, 1913. Serial No. 777,740.

*To all whom it may concern:*

Be it known that I, CARL BOSCH, citizen of the German Empire, residing at Ludwigshafen-on-the-Rhine, Germany, have invented new and useful Improvements in Producing Hydrogen and Apparatus Therefor, of which the following is a specification.

My invention relates to a process and apparatus for the production of hydrogen on a technical scale.

It is well known that hydrogen can be obtained by alternately passing steam over red-hot iron and then reducing the iron oxid formed by means of a reducing gas. For instance, Giffard, in the *Moniteur Scientifique*, 1873, page 157, states that he produces hydrogen by alternately passing a mixture of carbon monoxid and nitrogen, prepared from air and coke, through a furnace containing iron oxid until the oxid is reduced to iron, and then passing steam over the iron, whereby hydrogen is produced and the iron is converted again into its oxid, whereupon the cycle of operations is repeated. Further, Lewes, in the specification of British Patent No. 20,752/90 describes a particular method of carrying out this process. According to the method described in this specification, hydrogen is obtained by the decomposition of steam by contact with heated iron and the resulting iron oxid is reduced for re-use to the metallic state by subjecting it to the action of a reducing gas. The reducing gas is prepared by passing air over red-hot coke, and the heat generated by the production of the reducing gas is utilized to maintain the iron and the resulting oxid at a sufficiently high temperature for the reactions to take place, the furnace containing the iron and iron oxid being situated inside the coke-containing generator. Further, Hills and Lane, in the specification of British Patent No. 10,356/03 claim "a process for the production of hydrogen gas consisting in its essential features of the alternate oxidation of metal by steam and its deoxidation and restoration to chemical activity by crude gas, such as water-gas, coal gas, or other gases generated from carbonaceous fuel." According to the processes hitherto known, some maintain the heat in the reaction furnace by applying heat by combustion, either of solid or fluid material, immediately outside the furnace, or of gaseous material inside the furnace, but in processes involving heating by means of this description it is very difficult if not practically impossible to avoid local over-heating with the disadvantageous result that the contents of the furnace melt to some extent and incomplete reduction takes place. Another known process consists in employing hot reaction gases of such a temperature that a further heating of the reaction furnace is unnecessary, and for this purpose the hot crude generator gases are passed directly to the reaction furnace, heating this up and reducing the iron, while the excess of gases leaving the furnace are mixed with air and burnt in a regenerator through which steam is subsequently passed in the reverse direction on its way to the reaction chamber (see German Patent No. 77,350). This process presents the great disadvantage that the impurities contained in the generator gases clog the reaction mass and cause it to melt owing to the formation of iron silicate and also the generator gases contain sulfur and form iron sulfid and sulfureted hydrogen. For these reasons this process has hitherto not met with commercial success. A further process described in German Patent No. 95,070 consists in causing the purified generator gas or the steam on its way to the reaction furnace to be preheated on the countercurrent principle by the gases leaving the furnace, but this process also has not attained practical or commercial success by reason of the quantity of heat contained in the gases leaving the furnace not being sufficient to preheat the entering gases to the degree required.

I have now discovered that I can overcome the difficulties and disadvantages referred to and obtain hydrogen successfully on a commercial scale by employing purified reducing gas and by passing both the said purified reducing gas and the steam through regenerators which are situated outside the furnace containing the ferruginous mass and employing the reducing gas which leaves the furnace for heating up the regenerators by burning it with oxygen, either as such or in the form of air, in the said regenerators. By carrying out the process in this way, I am enabled to prevent impurities from entering the reaction mass and also to prevent the said mass from melting, besides being able to regulate the temperature, so that the furnace itself does not suffer by being overheated. Under the term purified reducing gas I include all reducing gases which can be employed without rendering the contents of the furnace inoperative; the gases may either be first obtained in an impure condition, such for instance as generator gas, and then be purified in any suitable manner, or a gas may be used which, from its method of production, is already in such a suitably pure condition that it may be employed directly for reduction of the iron oxid without its rendering the contents of the furnace inoperative too quickly.

A specific method of effecting the alternate oxidation and reduction of iron according to my invention consists in employing one furnace containing the iron in conjunction with two preheater furnaces, for instance of the Cowper type, and this combination of furnaces can be used as follows: Assuming the iron in a cylindrical oxidation and reduction furnace to be in the oxidized state and the first regenerator is at a high temperature, purified reducing gas is passed through the first regenerator and then through the vessel containing the iron oxid from the top to the bottom, whereby the iron oxid is reduced and part of the combustible gases is used up in removing the oxygen from the iron oxid. The gases leaving the iron are then mixed with some oxygen or air and are passed into and burnt in the second regenerator, thereby raising its temperature. When the iron oxid has been sufficiently reduced, steam is blown through the first regenerator and then through the cylinder containing the iron from the bottom to the top, whereupon hydrogen is produced. The period thus occupied is short and in the meantime the second regenerator either retains its heat or, if desired, it can be still further heated by burning fresh generator gas in it. The next period is filled up by passing purified generator gas through the freshly heated second regenerator, then, from above, through the vessel containing the iron oxid in order to effect its reduction, and then it is mixed with oxygen or air and is burnt in the first regenerator in order to raise its temperature again. After this, steam is blown through the second regenerator and into the cylinder containing iron, its direction being upward, whereupon more hydrogen is produced and the iron is oxidized. The system has thus been brought into its original condition and the cycle of operations commences anew. If sufficiently large regenerators capable of storing a large quantity of heat be made use of, reducing gas and steam can be passed alternately in the same direction through the apparatus several times in succession until the regenerator which is giving up heat to the reducing gas and steam respectively has become too cool to heat up the reducing gas or steam sufficiently, whereupon the gases are passed in the opposite direction through the apparatus. Such a method of working is obviously a modification of carrying out my process and does not depart from the nature of my invention.

Apparatus suitable for carrying out the process of my invention is illustrated in the accompanying drawings. In these Figure 1 represents a vertical section of the apparatus and Fig. 2 is a plan view of the same. Fig. 3 represents a view taken from above, showing how four regenerators can be employed in conjunction with one furnace.

Similar letters and figures in the drawing refer to similar parts.

In the drawings, $a$, $c$, $f$, $h$, $i$, and $k$ are regenerators, $b$ and $g$ are reaction furnaces, each being well isolated against loss of heat. The regenerators comprise a combustion channel 1 and 21 and a net work of fireproof bricks 2 and 22, the reaction mass being contained in the shaft 3 of the reaction furnace, while $d$ and $e$ are three-way valves, capable of being cooled.

The method of working may be, for instance, as follows: The regenerators are first heated to a high temperature by burning in them a mixture of generator gas or water-gas with air, while the waste gases pass through the valves 8 and 9 into the chimney. As soon as the desired temperature is attained, one of the valves leading to the chimney, for instance 8, is closed and, after opening valve 10, reducing gas is blown through the apparatus in the directions 2—1—12—14—18—3—17—13—21—22—9 or 2—1—12—16—3—19—15—13—21—22—9, whereby the reaction mass in the furnace is heated and reduced, an alternate passing of the gases from above and from below through the furnace further causing the reaction mass to attain a fairly uniform temperature. The excess of reducing gases is then mixed with the necessary amount of air from 5 and burnt in $c$. When the temperature in the regenerator $a$ diminishes, the gases are passed through the apparatus in the reverse direction, that is to say, from 11 to 8, so that the regenerator $a$ is again raised to a high temperature. If desired, however, the fall of temperature in the regenerator can be diminished by adding a small quantity of air to the reduction gases, whereupon an equivalent small quantity of reducing gas is burnt in the regenerator. When the necessary temperature in the reaction furnace is attained, assuming the gases were last passed in the direction 10 to 9, the valve 10 is closed and steam is passed through the valve 23, so as to wash out the whole apparatus with steam or hydrogen, preferably allowing the steam to enter the shaft 3 of the reducing furnace from above; the impure hydrogen which is formed is mixed with air from 5 and burnt in the combustion chamber 21 of the regenerator. The three-way valve *d* is then so operated that the steam passes through 16 up into 3 and the valve 25 is opened and the valve 13 is closed, whereupon the hydrogen passes off in a pure state through 25 to the gasometer. When the oxidation period is over, the reaction mass is reduced again as above described. The valves 4, 6, 7 and 24 are for use in supplying combustible gases, air, or steam to the regenerators to which they are respectively attached. If, after a series of oxidation and reduction periods, the temperature in *a* has sunk too low, the gases are passed in the reverse direction, so that the regenerator *c*, which in the meantime has attained a high temperature, gives up its heat to the reducing gases and the steam, while the temperature of the other regenerator is being raised again by burning the excess of reducing gases therein, either alone or with fresh gas in addition.

The arrangement of regenerators with the common reducing furnace may be varied without departing from this invention; for example there may be a central reducing furnace and two regenerators with suitable connections and three-way valves, or three or more regenerators may be used arranged radially around a reducing furnace, as shown for instance in Fig. 3.

Now what I claim is:

1. The process of producing hydrogen by alternately passing steam and a purified reducing gas over a ferruginous mass and passing the steam and the reducing gas before they enter the reaction furnace through regenerators situated outside the furnace and passing the reducing gas, after it leaves the said furnace, in admixture with oxygen, through one of the said regenerators, thereby raising the temperature of the said regenerator.

2. The process of producing hydrogen by alternately passing steam and a purified reducing gas over a ferruginous mass and passing the steam and the reducing gas before they enter the reaction furnace through regenerators situated outside the furnace and passing the reducing gas, after it leaves the said furnace, in admixture with oxygen and other combustible gas, through one of the said regenerators, thereby raising the temperature of the said regenerator.

3. The cyclic process of producing hydrogen by passing purified reducing gas through a hot first regenerator, then through a reaction furnace containing iron oxid, then adding oxygen to the gases leaving the said furnace and passing the mixed gases through a second regenerator, then passing steam through the first regenerator and then through the furnace, whereby the iron is oxidized and hydrogen is set free, then passing purified reducing gas through the second regenerator, then through the furnace, and then, after admixture with oxygen, through the first regenerator and then passing steam through the second regenerator and then through the furnace.

4. Apparatus for the production of hydrogen comprising a furnace containing ferruginous material, a plurality of regenerators, and suitable connections for leading gas to and from the said furnace and regenerators.

In testimony whereof I have hereunto set my hand in the presence of two subscribing witnesses.

CARL BOSCH.

Witnesses:
J. ALEC. LLOYD,
JOSEPH PFEIFFER.